No. 758,553. PATENTED APR. 26, 1904.
L. MILLER.
GLASS GATHERING MACHINE.
APPLICATION FILED JULY 18, 1902.
NO MODEL. 9 SHEETS—SHEET 4.

Fig. 3

Witnesses:
Geo. H. Harvey.
F. N. Barber

Inventor,
Leo Miller,
by his Attorney
Wm. L. Pierce

No. 758,553. PATENTED APR. 26, 1904.
L. MILLER.
GLASS GATHERING MACHINE.
APPLICATION FILED JULY 18, 1902.
NO MODEL. 9 SHEETS—SHEET 6.

Witnesses:
Geo. H. Harvey.
F. N. Barber.

Inventor.
Leo Miller,
by his Attorney
Wm. L. Pierce

No. 758,553. PATENTED APR. 26, 1904.
L. MILLER.
GLASS GATHERING MACHINE.
APPLICATION FILED JULY 18, 1902.
NO MODEL. 9 SHEETS—SHEET 7.

Fig. 6.

Witnesses:
Geo. H. Harvey.
F. N. Barber

Inventor,
Leo Miller,
by his Attorney Wm. L. Pierce

No. 758,553. PATENTED APR. 26, 1904.
L. MILLER.
GLASS GATHERING MACHINE.
APPLICATION FILED JULY 18, 1902.
NO MODEL. 9 SHEETS—SHEET 8.

Witnesses:
Geo. H. Harvey
F. N. Barber

Inventor,
Leo Miller,
by his Attorney
Wm L. Pierce

No. 758,553. PATENTED APR. 26, 1904.
L. MILLER.
GLASS GATHERING MACHINE.
APPLICATION FILED JULY 18, 1902.
NO MODEL. 9 SHEETS—SHEET 9.

WITNESSES
Geo. H. Harvey
F. N. Barber

INVENTOR.
Leo Miller,
by his Attorney
Wm. L. Pierce.

No. 758,553. Patented April 26, 1904.

UNITED STATES PATENT OFFICE.

LEO MILLER, OF TIFFIN, OHIO.

GLASS-GATHERING MACHINE.

SPECIFICATION forming part of Letters Patent No. 758,553, dated April 26, 1904.

Application filed July 18, 1902. Serial No. 116,094. (No model.)

*To all whom it may concern:*

Be it known that I, LEO MILLER, a citizen of the United States, residing at Tiffin, in the county of Seneca and State of Ohio, have invented or discovered new and useful Improvements in Glass-Gathering Machines, of which the following is a specification.

In the accompanying drawings, which make part of this specification, Fig. 1$^a$ is a continuation of Fig. 1, showing a glass-tank broken away and in vertical section.

My invention relates to mechanism for the gathering of definite quantities of molten glass from pots or tanks and depositing said glass in molds or other receptacles; and the object of my invention is to facilitate the operation of gathering definite quantities of glass and to deposit the same with greater accuracy than heretofore.

The bed of the machine consists of two side plates A tied together by the bolts $a$ and spaced apart by sleeves $a'$, (only one being shown,) which inclose the said bolts. These sleeves are supported on screws A′, with which coöperate nuts A$^2$, bearing on supports $a^2$. By turning the nuts the bed can be adjusted to any required height, so as to suit the requirements of the furnace and molds.

Figure 1:
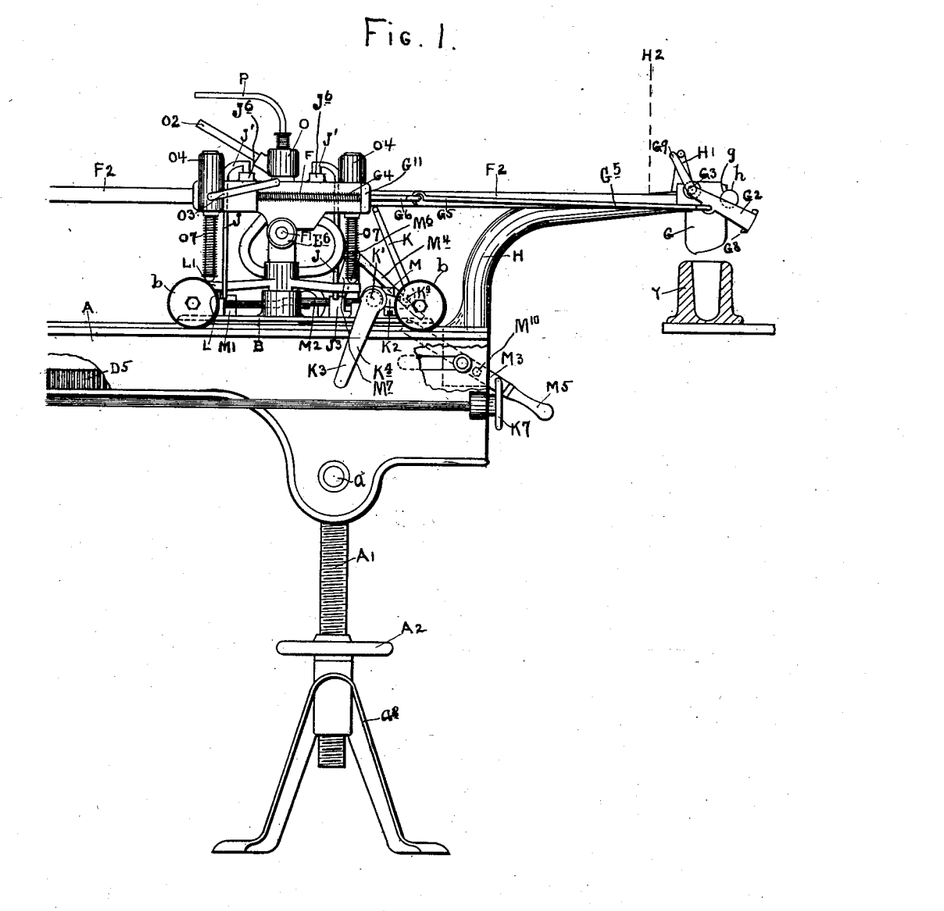
Figure 1 is a side elevation of my invention, showing the position of the parts when discharging the glass.
Figure 1A:
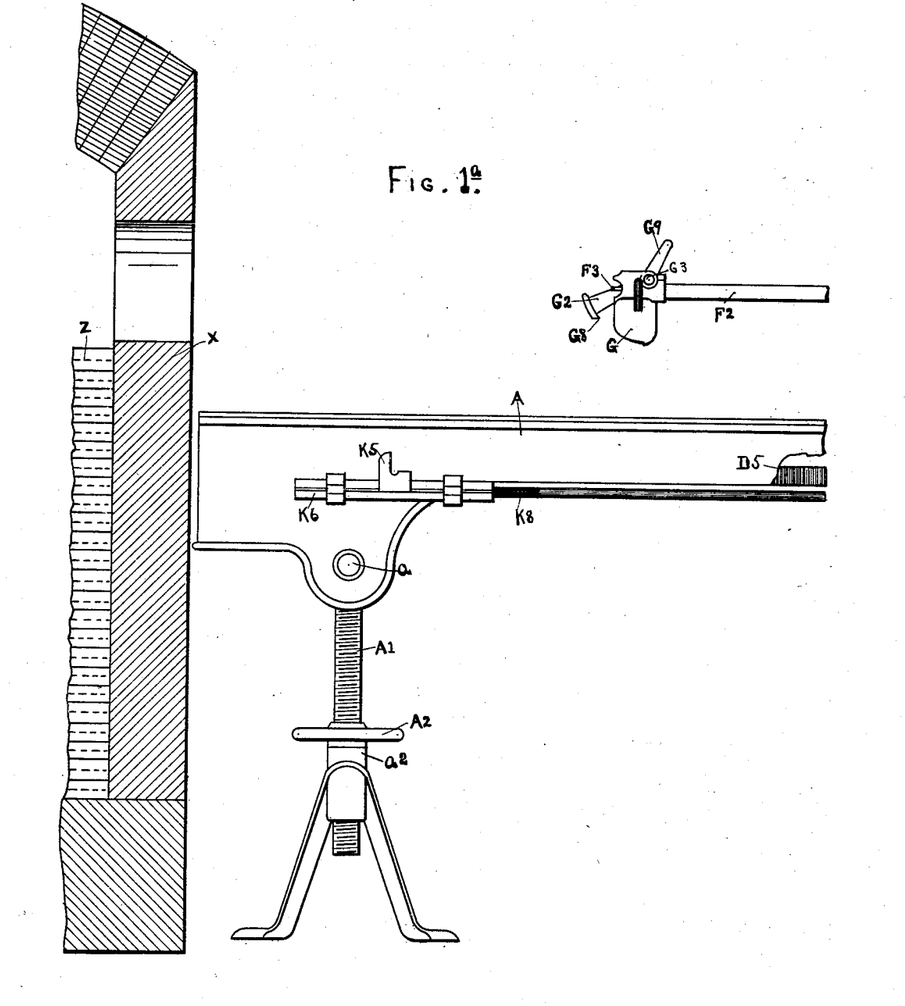
Figure 2:
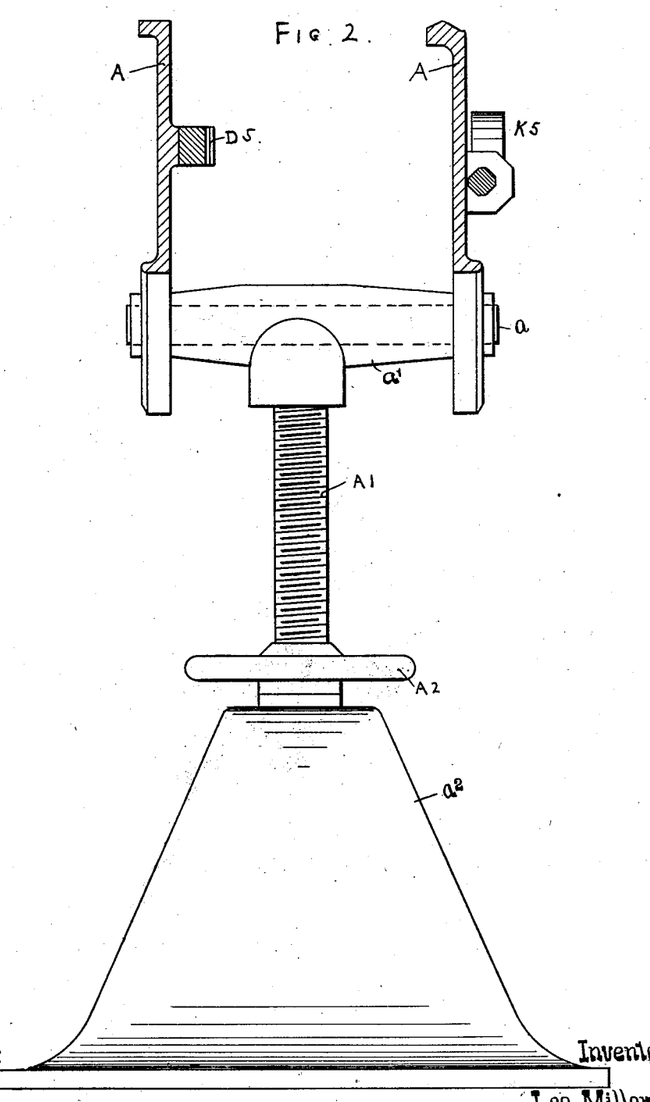
Fig. 2, a sectional end elevation of the bed and stand.
Figure 3:
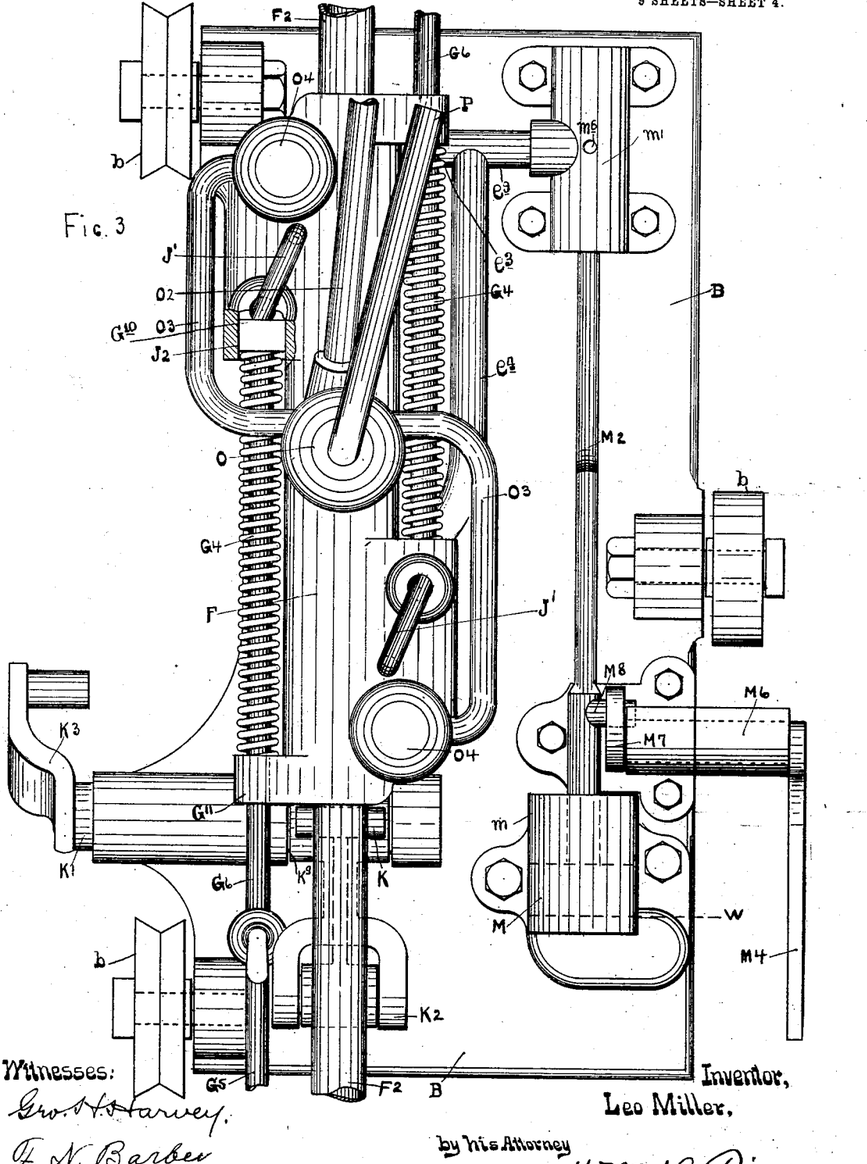
Fig. 3, a plan view of the carriage and turret-head.
Figure 4:
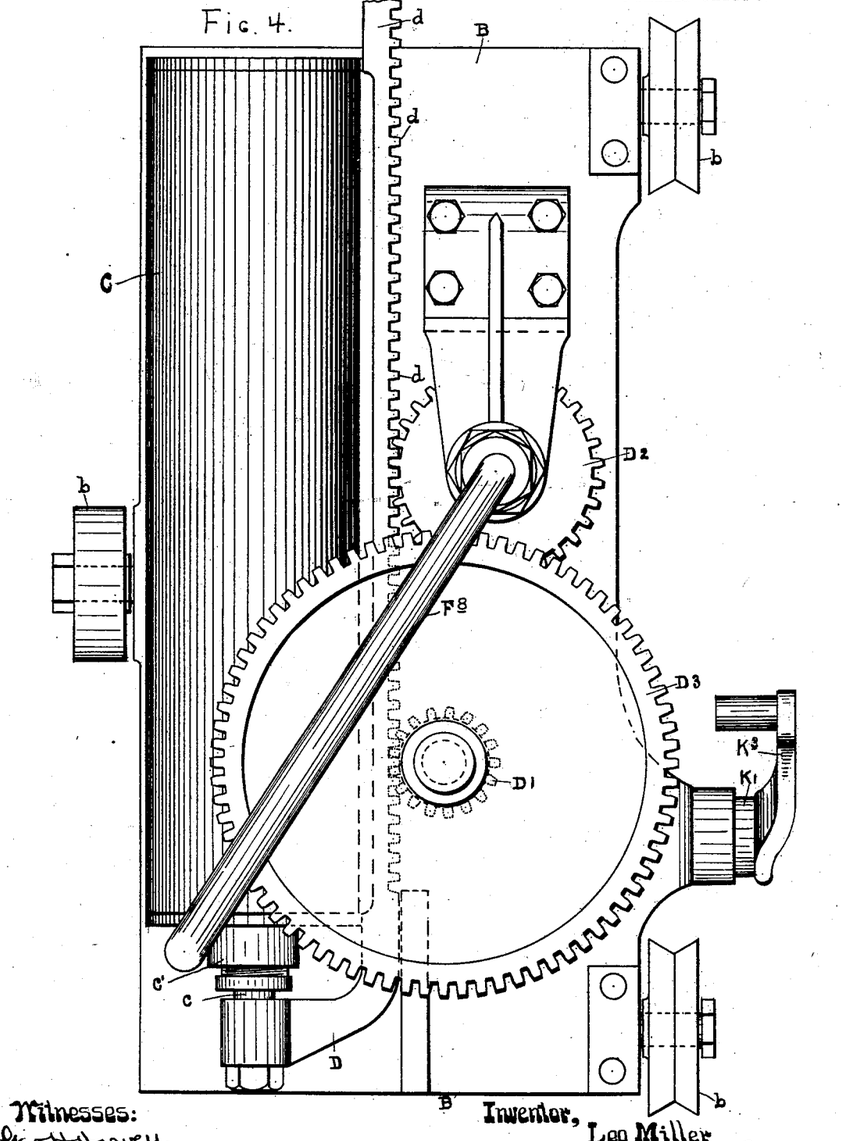
Fig. 4, an under side plan view of the bottom of the carriage.
Figure 5:
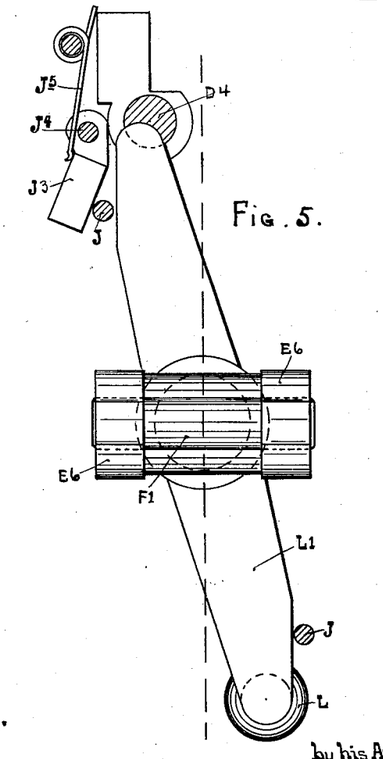
Fig. 5, a plan view of the radial arms for releasing the mechanism which severs the glass in the gathering-head from the body of glass from which the gather is taken, some of the parts coöperating with the arms being shown in horizontal section.

B is the carriage, having wheels $b$, which travel on the side plates A. This carriage carries the mechanism by which the glass is gathered and delivered to the molds. On the under side of the carriage and near one edge is a long cylinder C, in which travels a piston C′, having piston-rod $c$. The piston-rod passes through a stuffing-box $c'$ in one end of the cylinder, the outer end being secured to the arm D, which is an offset backwardly-turned extension from the piston and which carries rack $d$, lying beside the cylinder near the center of the carriage. The carriage carries the stub-shaft D$^4$, on which are loosely mounted the connected cog-wheels D′ and D$^3$, the former gearing with said rack and the latter with the fixed rack D$^5$, secured to the inner side of one of the plates A, as shown in Figs. 1 and 2.

Supported on the bracket $b'$ of the carriage is the rotatable tubular shaft E, connected at the bottom to the tube F$^8$ and having in its side wall near the top the ports $e$, $e'$, and $e^2$. Flexible tube F$^7$ is secured to the outlet of passage F$^9$ and to the inlet of port $e$. Flexible tube $p^3$ is secured to the outlet of port $p'$ and the inlet of port $e'$. A passage $e^5$ in tubular shaft E connects the outlet of port $e'$ to the inlet of port $e^2$, and at each semirevolution of the tubular shaft E port $e^2$ alternately communicates with either stationary tube $e^3$ or $e^4$. These tubes in turn converge into a single tube, which forms the inlet-port $e^9$ of the cylinder $m'$. A collar E$^2$, having two openings E$^3$ with inclined faces $e^{10}$, is fixed on the tubular shaft E beneath the bed, and a pinion D$^2$ is loosely mounted on the tube below the collar E$^2$. The pinion D$^2$ carries a pin E$^4$, which is composed of a vertical arm extending through a slot in the pinion D$^2$ and having an inclined head $e^9$ and surrounded below an integral lateral projection $e^6$ by a spring E$^5$, which is held in position by the downwardly and outwardly projecting arm $e^8$, carried by the pinion and through which the lower end of the pin is free to move vertically. The pin $E^4$ is free to enter the openings $E^3$ and revolve the turret in one direction except when the projection $e^6$ comes in contact with the fixed cam B', located on the bracket $b'$, which causes the pin to be withdrawn from one of the openings $E^3$. When the pinion $D^2$ is revolved by rack $d$ in the opposite direction and the projection $e^6$ is out of contact with the cam B', as hereinafter explained, the pin enters the openings $E^3$, and by coöperation of the inclined face $e^{10}$ of the openings $E^3$ and the inclined head $e^9$ of the pin $E^4$ the pin is pushed downwardly from the opening. A collar $E'$ rigid on the tubular shaft supports the pinion $D^2$. The upper end of the tubular shaft has bearings $E^6$ for the pin $F'$, on which the turret F may swing vertically. The turret is bored horizontally, and the bore is continued at each end by the tubes $F^2$, through which extend the valve-rods $F^3$, passing entirely through the gathering-heads G on the ends of the tubes $F^2$, the heads having arc-shaped notches $g$ into which the said ends can project. The inner end of each rod $F^3$ has a valve $F^5$, adapted to control a passage $F^9$ in the turret leading to the tube $F^7$. The rod $F^3$ is provided with a shoulder $F^4$, which normally prevents the movement of the rod toward the outer ends of the tubes $F^2$ by reason of its engagement with the sliding catch $G'$, seated in a cavity at the top of the gathering-head. The reduced portion $F^{10}$ of the rod passes through a hole $G^{12}$ in the catch. The hole $G^{12}$ will permit the passage of the shoulder portion of the rod $F^3$ when the catch has been raised. A channel $p^2$ in the turret connects the passages $F^9$ above the valves $F^5$, so that when either valve has been slid, as below described, toward the port $p'$ sufficiently far compressed air can pass into one of the tubes $F^2$.

$G^2$ is a cut-off and cover for the head G and is hinged thereto at $G^3$. It has a sharp edge $G^8$, which serves to cut off the surplus glass from that in the receptacle of the gathering-head. The cut-off is operated by a rod $G^5$, connected thereto and to the rod $G^6$. The latter rod passes through a bracket $G^{11}$ and has at its opposite end a head $G^{10}$, between which and the bracket is a spring $G^4$, encircling the rod.

H is an arm adjustably secured to the side of one of the plates A at the outer end of the bed of the machine. It extends upwardly to the bed of the carriage and then inwardly until it is in line with the side of tube $F^2$, when it extends upwardly and outwardly to the level of the upper part of the head G and has its end $h$ turned at a right angle, so as to be received into notch $g$ of the head G, as shown in Fig. 1. The arm H has also an arm H', extending across the path of the arm $G^9$ on the upper end of the cut-off $G^2$.

J J are rods which pass through the turret F and have their upper ends J' bent over and adapted to pass down through an opening in the lugs $J^6$, located above the end of the spring-guides $J^2$ and into the path of the headed rods $G^6$, forming tripping-catches for said rods $G^6$.

$J^3$ is a shoe pivoted at $J^4$ to the carriage B and pressed toward the lower end of the outer rod J by a spring $J^5$. When the turret F rocks on the pivot F' toward the furnace, the lower end of the rod J nearest the mold $y$ will rise above the shoe $J^3$, which will be pressed under it by the spring $J^5$ and on the turret rocking back to its horizontal position will elevate the rod J.

K is a rod which engages the under side of the pipe $F^2$ farthest from the glass-tank X and is pivoted at $K^9$ to the horizontal arm $K^2$ of the bell-crank lever $K^3$, whose other arm, $K^4$, extends downwardly and whose fulcrum is $K'$.

$K^5$ is a lug for operating the arm $K^4$ of the bell-crank lever $K^3$ and is secured to the bar $K^6$, which is adjusted by the hand-wheel $K^7$ and screw $K^8$, threaded into the bar $K^6$.

A spring-actuated stop L, having an inclined head $L^2$, is attached to the bed of carriage B and in line with the swing of the radial arms L', secured on tubular shaft E, which have corresponding inclines $L^3$, into which the head of stop L enters to hold the arms, and consequently the turret, from swinging while the carriage B returns to the tank X and while the gathering-head is being filled or discharged.

M and M' are two piston-valves connected by the rod $M^2$ and slidable in the cylinders $m$ and $m'$. $m'$ has an inlet-port $m^5$ and an exhaust-port $m^6$. M has an exhaust-port $m^4$, and M' has an inlet $m^2$ and an exhaust-port $m^3$. Valve M regulates the exhaust and air-supply to the front end of cylinder C and valve M' the exhaust and air-supply to the rear end of said cylinder. A lever $M^3$, having a laterally-projecting stud $M^9$, is pivoted at $M^{10}$ to the arm H, and the lug is adapted to engage under one end of lever $M^4$, pivoted to the pin $M^6$ and provided with an arm $M^7$, which is in engagement with a pin $M^8$ on the valve-rod $M^2$. $M^5$ is the handle on the lever $M^3$.

O is a stationary cap secured on the cone O' of the turret F, and it is held in position by means of spring $P^9$, which surrounds the tube $P^{10}$ and bears against the nut $P^8$ and the head of said cap.

$O^2$ is a pipe leading from a source of exhaust into the annular groove $P^{11}$ of the cap O.

$O^9$ is a passage in the cone O' and communicates with the annular groove $P^{11}$ and the pipes $O^3$, which leads from openings in the valve-casing $O^4$ on opposite ends of the turret.

Slidable in the casings $O^4$ are valves $O^6$, having stems $O^8$ resting on the arms of the carrier L'. Said valves are at the sides of the tubes $F^2$ and communicate therewith by ports $O^5$.

Normally the valves are held at the bottoms of the casings, so as to cut off the ports $O^5$ by means of spring $O^7$.

P is a pipe leading from some source of pneumatic pressure and passes through cap O and connects with the passage $p$, which leads downwardly at the side of the bore in the turret and communicates with such bore through the port $p'$ and with the tube $p^3$.

Figure 6:
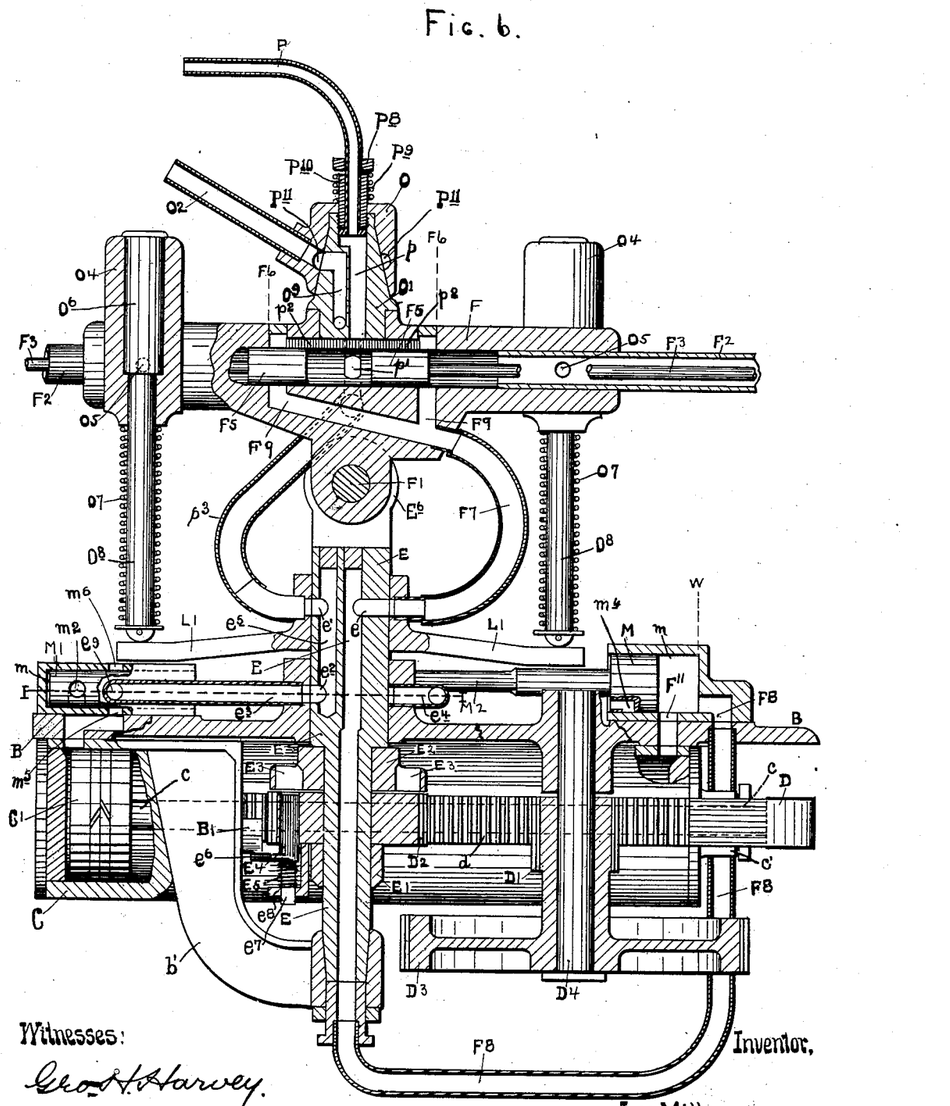
Fig. 6, a sectional side elevation of the carriage and turret-head, showing the valves, ports, and general working parts when in the discharging position.
Figure 7:
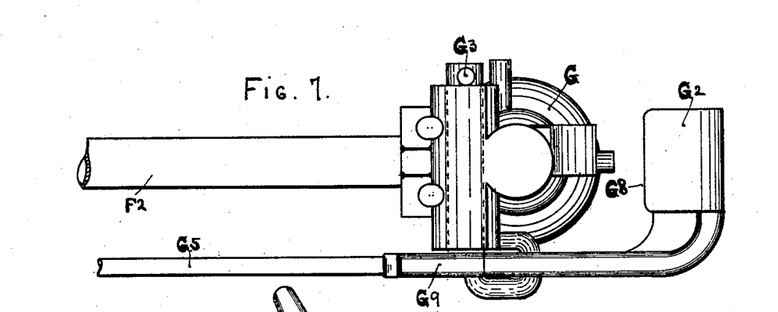
Fig. 7, a plan view of the gathering-head and cut-off.
Figure 8:
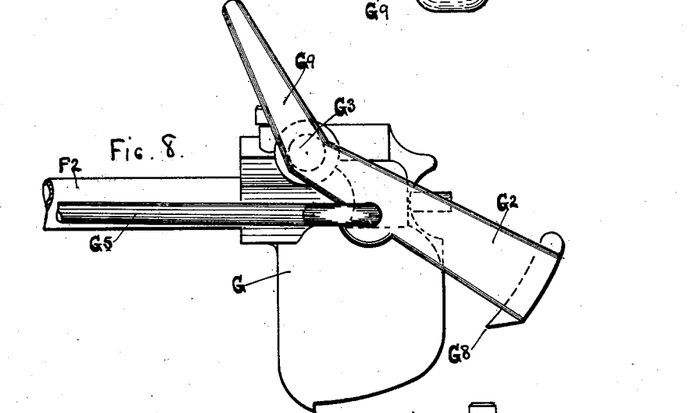
Fig. 8, a side elevation of the same.
Figure 9:
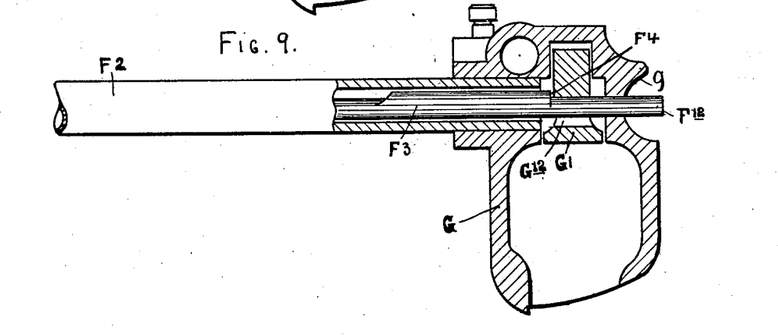
Fig. 9, a sectional side elevation of the gathering-head.
Figures 11, 12, 13:
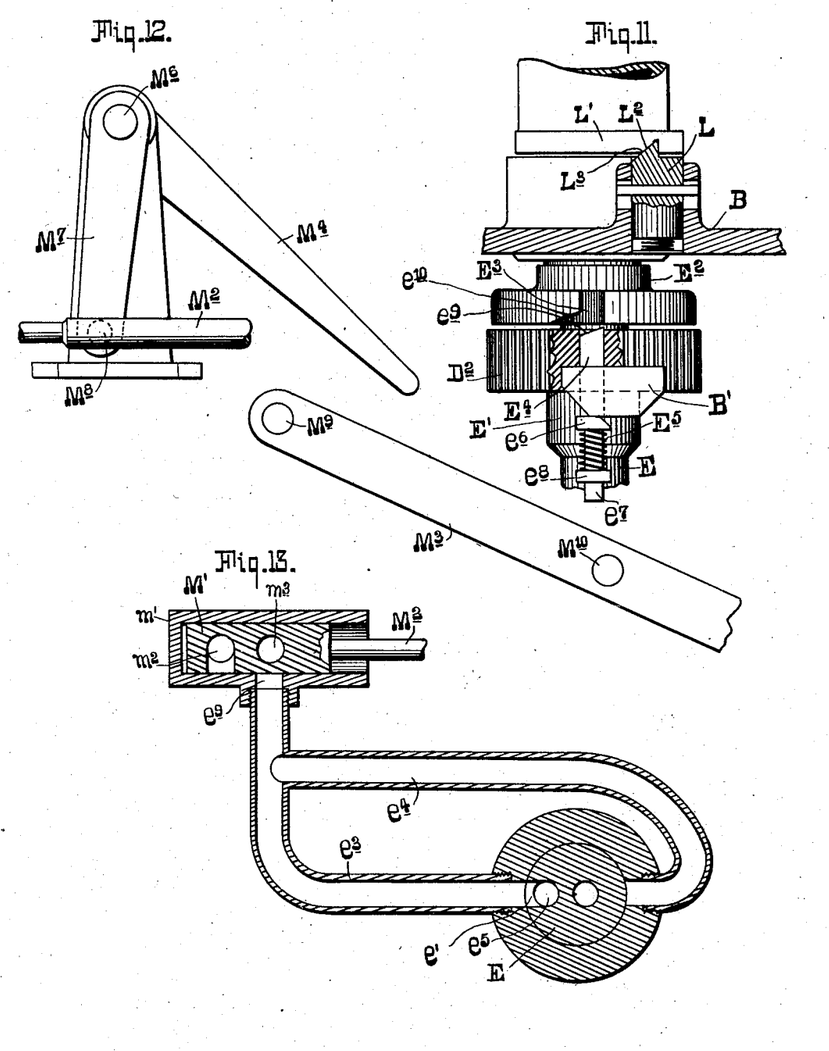
Fig. 11, a detail end elevation, partly in section, showing the operation of two spring-actuated clutches.
Fig. 12, a detail side elevation of the lever used for shifting the cut-off valve.
Fig. 13 is a detail section on line I I of Fig. 6.

The operation is as follows: The machine being in the position shown in Figs. 1, 1ᵃ, and 6, compressed air being applied to tube P and the exhaust to the tube $O^2$, the operator presses down the lever $M^3$, which causes the lever $M^4$ to slide the valve-rod $M^2$ and valves M and $M'$ to the right until valve M reaches the dotted-line position W in Fig. 6. This allows pressure to pass to the left of piston $C'$ by way of pipe P through passage $p$, tube $p^3$, port $e'$, passage $e^5$, port $e^2$, pipe $e^3$, port $e^9$, and port $m^2$ of valve $M'$. The piston now moves to the right, causing the pinion $D'$ and wheel $D^3$ to rotate, the latter rolling along rack $D^5$ and moving the carriage to the left. The pinion $D^2$ is at the same time rotated; but the turret is not rotated, because the dog $E^4$ in the pinion $D^2$ will now be moving to the left as viewed in Fig. 11, and though it will again enter the notch $E^3$ as the projection $e^6$ rides off from the cam $B'$ the incline $e^9$ on the dog will ride down on the incline $e^{10}$ on the pinion, and the dog will then ride along the under side of the collar $E^2$, while the latter remains stationary. The dog will also pass beyond the other notch $E^3$ before the gathering-head has completed its left-hand movement in order that the carriage may withdraw the gathering-head from the furnace before the dog engages the notch $E^3$ to cause the turret to revolve. When the left-hand gathering-head has entered the tank X, the arm $K^4$ of bell-crank lever $K^3$ engages lug $K^5$ and causes rod K to rise and tilt the turret toward the tank, causing the gathering-head to dip into the molten glass Z. The tilting of the turret causes the left-hand valve-casing to slide down on the valve-stem, whereby the exhaust is connected to left-hand tube $F^2$ through tube $O^2$, annular groove $P^{11}$, passage $O^9$, left-hand tube $O^3$, and port $O^5$. The exhaust sucks up glass from the tank X until the glass lifts catch $G'$ above shoulder $F^4$, whereupon the pressure constantly in the bore of the turret and between the valves $F^5$ on the rods $F^3$ slides left-hand rod $F^3$ to the left, so that the right-hand end of left-hand valve $F^5$ will go to the left dotted line $F^6$ on Fig. 6. Pressure from pipe P now enters cylinder $m$ by way of passage $p$, left-hand passage $F^9$, tube $F^7$, port $e$, tubular shaft E, tube $F^8$ and pushes valves M and $M'$ to the left, cutting off pressure from cylinder $m'$ and permitting pressure to enter the left-hand end of cylinder C by way of port $F^{11}$, whereupon the piston is driven back to the position shown in Fig. 6. In this position exhaust-port $m^3$ of valve $M'$ registers with ports $m^5$ and $m^6$ of cylinder $m'$. As the carriage starts to go back to the right the arm $K^3$ is freed from lug $k^5$ and the left spring $O^7$ raises the turret to its horizontal position. In rocking back to said position the shoe $J^3$, which is now under the end of the right-hand rod J, as already described, lifts the tripping-catch $J'$ out of the path of the head $G^{10}$ of the rod $G^6$, connected to cut-off $G^2$, whereby the edge $G^8$ cuts off the glass hanging to the receptacle of the gathering-gear and forms a cover or bottom for the gathering-head G. As the gathering-head comes clear of the wall of the tank X the clutch-pin $E^4$ enters into one of the holes $E^3$ in the collar $E^2$ and imparts a semirevolution to the turret F and brings the gathering-head against the arm H at the dotted line $H^2$, so that the gather will be substantially over the mold Y. At this time the pin $E^4$ is withdrawn from the hole $E^3$ by the lug $B'$. (Shown in Figs. 6 and 11.) The gathering-head still moves to the right until the arm $G^9$ by engagement with arm $H'$ removes the cut-off $G^2$ from the bottom of the head and until the end $h$ of the arm H has caused the rod $F^3$ to slide to the left, thus moving the right-hand valve $F^5$, so that pressure is admitted to the right-hand tube $F^2$ by way of right-hand passage $p^2$, as shown in Fig. 6. This pressure drives the glass from the gathering-head into the mold Y. This completes the operation for one gathering or charge. When another gather is to be made, the carriage will, as above explained, move toward the tank without revolution, so that the gathering-head opposite the one which made the gather will now become operative. When the receptacle in the gathering-head has been filled, the carriage returns to the position shown in Fig. 1, the turret revolving a half-revolution, so as to discharge the gather into the mold Y.

Figure 10:
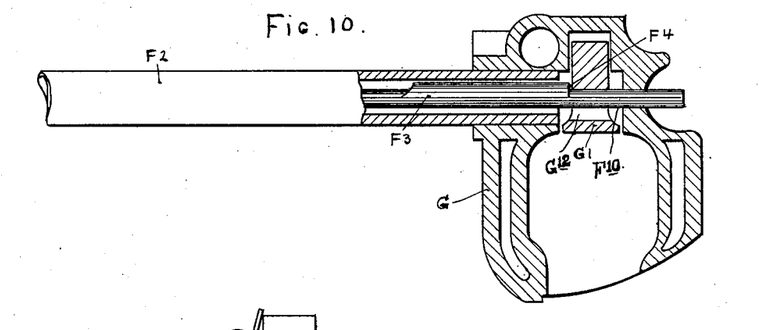
Fig. 10, a sectional side elevation of a gathering-head having a water-jacket.

Fig. 10 represents a water-cooled head, the water being applied through pipes. (Not shown.)

Having described my invention, I claim—

1. In a machine for gathering glass, a hollow gathering-head, and means whereby the air therein may be exhausted to cause the glass to enter therein and whereby compressed air may be conveyed thereto to expel the glass in combination with means for bringing the head into operative connection with the glass.

2. In a machine for gathering glass, a gathering-head having a receptacle and supplied with means for admitting compressed air to or rarefying air in a receptacle in the head and provided with a movable catch which is floated up by the molten glass admitted to the said receptacle, air-valves, and mechanism released by said catch for operating the said valves.

3. In a machine for gathering glass, a movable carriage, a gathering device carried thereon, and means for operating the carriage comprising a cylinder, a piston therein, a rack operated thereby, a pinion driven by the rack, a gear-wheel secured to the pinion, and a fixed rack on which the gear-wheel travels.

4. In a machine for gathering glass, a gathering-head having a receptacle therein, a cut-off carried thereby and adapted to sever the glass in the receptacle from the surplus gather, and means including a tripping-catch for controlling the operation of the cut-off.

5. In a machine for gathering glass, a tilting gathering-head having a receptacle therein, a cut-off for the receptacle, a tripping-catch, and means released upon the tripping of the catch and operated on the ascent of the head from the glass for operating the cut-off.

6. In a machine for gathering glass, a tilting gathering-head having a receptacle, a cut-off for the receptacle, a spring-controlled rod connected to the cut-off, a catch governing said rod, a shoe adapted, when the head tilts to enter the glass, to seat itself so that, when the head tilts back, the cut-off will be operated.

7. In a machine for gathering glass, a bed, a carriage movable thereon, a gathering-head, a rotatable carrier therefor, a piston on the carriage, a rack operated by the piston, a rack on the carriage, gearing connecting said racks, and a pinion engaging the movable rack and driving the rotatable carrier.

8. In a machine for gathering glass, a bed, a carriage thereon, a cylinder on the carriage, a piston, in the cylinder and carrying a rack, a rack on the bed, gearing connecting the said racks, a gathering-head carried by the carriage and having a receptacle, valves for controlling the exhaustion of air from, and the admission of compressed air to, the receptacle and for controlling the alternate admission of compressed air to opposite sides of the piston, and means for automatically controlling the valves.

Signed at Tiffin, Ohio, this 27th day of June, 1902.

LEO MILLER.

Witnesses:
AGNES THERESA MILLER,
VICTOR JOHN MILLER.